United States Patent [19]

Anderson

[11] Patent Number: 5,609,213
[45] Date of Patent: Mar. 11, 1997

[54] SOD CUTTING EDGER AND TRENCHER

[76] Inventor: Robert C. Anderson, 3248 N. Second St., Minneapolis, Minn. 55412

[21] Appl. No.: 532,490

[22] Filed: Sep. 22, 1995

[51] Int. Cl.⁶ ........................................... A01D 35/08
[52] U.S. Cl. ........................................ 172/17; 30/DIG. 5
[58] Field of Search ........................ 172/17, 18, 13, 172/16; 30/DIG. 5

[56] References Cited

U.S. PATENT DOCUMENTS

| | | |
|---|---|---|
| 1,006,758 | 10/1911 | Karass . |
| 1,052,789 | 2/1913 | Bergstrom .............................. 172/17 |
| 1,106,620 | 8/1914 | Bodine .................................... 172/17 |
| 1,112,502 | 10/1914 | Walter ..................................... 172/17 |
| 1,438,095 | 12/1922 | Clark .................................. 172/13 X |
| 1,505,685 | 8/1924 | Allen .................................. 172/17 X |
| 1,610,874 | 12/1926 | Marthen .................................. 172/17 |
| 1,693,808 | 12/1928 | Catudel .................................... 172/17 |
| 2,175,984 | 10/1939 | Welsh ..................................... 172/17 |
| 3,011,562 | 12/1961 | Brasch .................................... 172/17 |

*Primary Examiner*—Terry Lee Melius
*Assistant Examiner*—Christopher J. Novosad
*Attorney, Agent, or Firm*—John W. Adams

[57] ABSTRACT

A sod cutter and trencher which includes a pair of handle members with a roller at the lower end thereof and a cutter blade fixed behind the roller and extending downwardly therebelow into ground engaging trenching position and also includes a kick-bar for engagement by the operator's foot for applying downward and forward force for producing the desired trenching action.

3 Claims, 1 Drawing Sheet

SOD CUTTING EDGER AND TRENCHER

BACKGROUND OF THE INVENTION

A number of different style trenching devices have been developed over the years such as those shown in the following U.S. Pat. No. 1,006,758, G. Karass, Lawn Edge Trimmer; U.S. Pat. No. 1,400,627, C. Rosel, Lawn Edging Machine; U.S. Pat. No. 1,544,359, J. Tolbert, Sidewalk Edger; U.S. Pat. No. 1,547,386, F. A. Hanson, Turf Edger; U.S. Pat. No. 1,622,998, A. L. Foster, Lawn Edger.

None of these patents shows a kick-type cutter capable of producing a trench having a straight side. This is important for imbedding an edger strip in the trench to define the edge of a lawn adjacent to a garden or shrubbery section of the yard.

All of the prior art known to Applicant consists of the devices shown in the above listed patents and is generally used for a different purpose. None of the trimmers illustrated in these patents shows a device specifically adapted for receiving a trim strip and providing a firm wall against which the trim strip can be positively supported when backfilled on the opposite side of the strip.

SUMMARY OF THE INVENTION

This invention provides a kick-type cutter device supported generally by a lead roller element which engages the ground and permits the operator to exert downward and forward force on a kick-bar located behind the roller and in slightly raised position to facilitate the kicking operation. The trencher blade is located between the kick-bar and the roller and is provided with a straight substantially vertical side to produce a trench having a straight side and with the other portion of the blade extending across to the opposite handle portion to produce a V-shaped trench.

DESCRIPTION OF THE INVENTION

Figure 1:
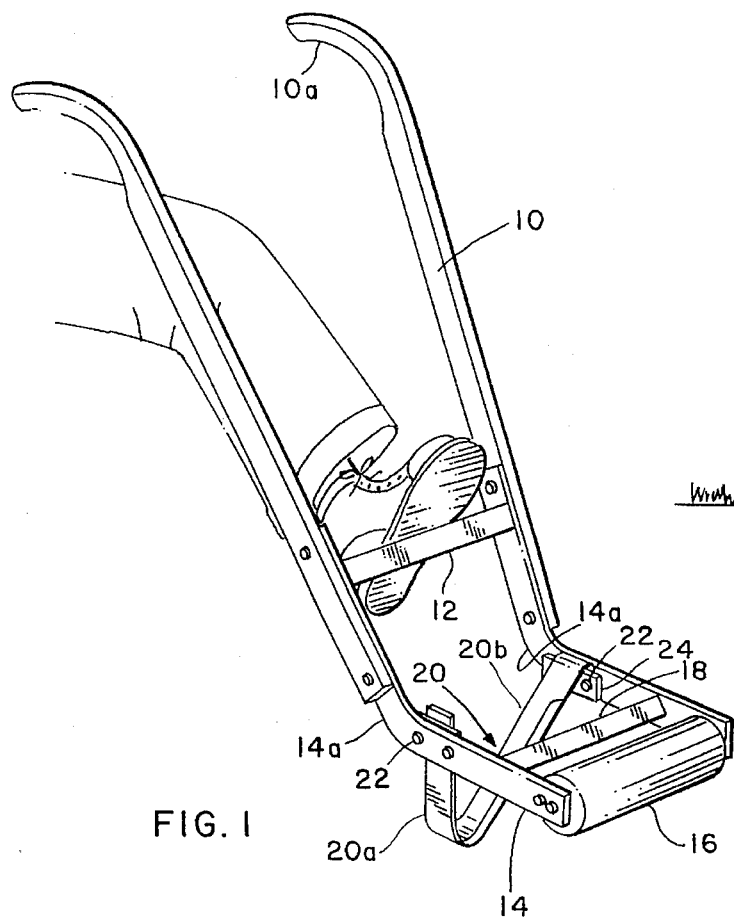
FIG. 1 is a perspective view showing a device embodying the invention.
Figure 2:
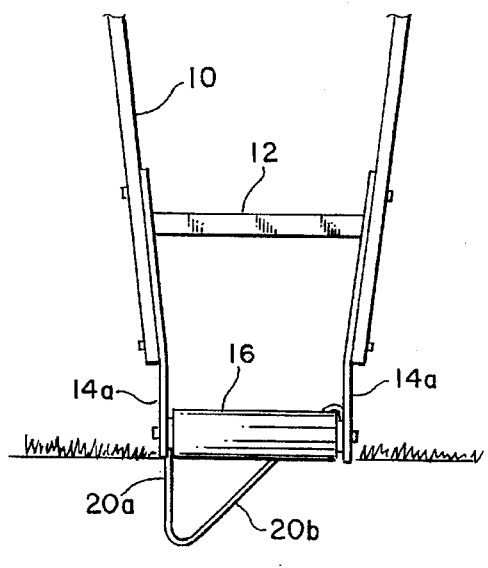
FIG. 2 is a vertical sectional view of the device in operation.
Figure 3:
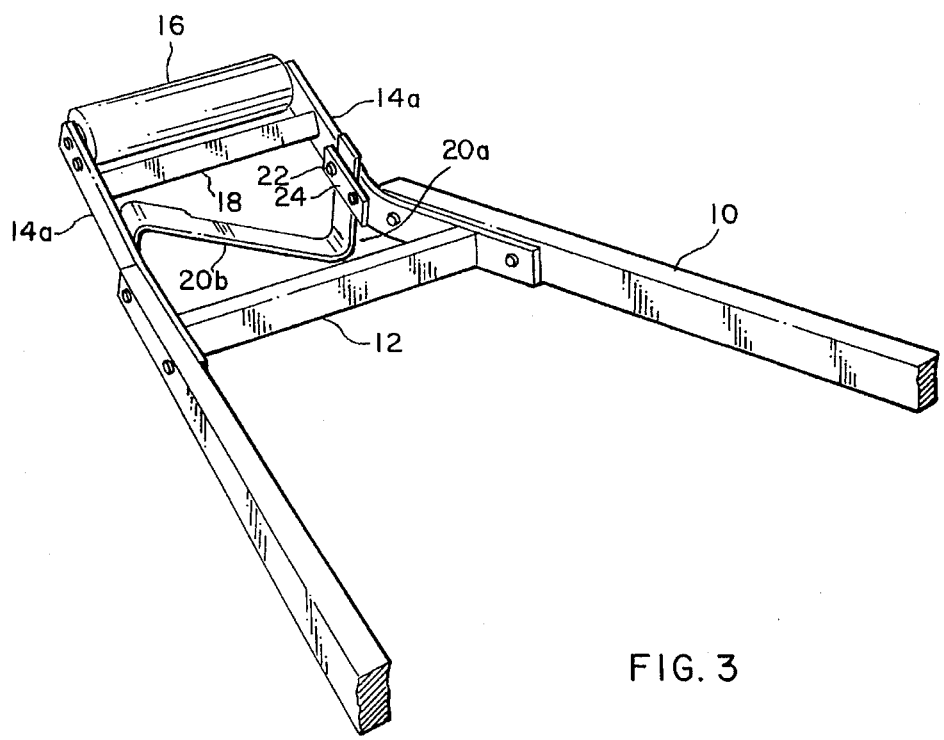
FIG. 3 is a perspective view looking at the device from the rear and illustrating diagrammatically a typical edger strip positioned along the vertical wall of the trench produced.

Kicker-type sod cutters having a straight cutting blade have been in use for a number of years. The concept of providing a blade having a straight edge and a sloping trenching portion is embodied in the present cutter unit.

The cutter includes a pair of spaced-apart handle elements 10 each having hand grips 10a at the top thereof. A kick-bar 12 extends between the two handles 10 and is located at a convenient elevation for the operator to apply downward and forward kicking force to the mechanism when in operation.

A pair of mounting frames 14 are fixed at the lower ends of the handles 10 and are provided with a bend 14a therein which permits the elements 14 to be oriented in a substantially horizontal position when the device is in operation. A ground-engaging roller 16 is journaled between the arms 14 at the forward ends thereof to support the unit during operation and facilitate forward movement of the unit in response to kicking pressure on the kick-bar 12. A cross brace 18 is fixed between the extension arms 14 behind the roller 16 and provides a rigid frame structure for supporting the roller 16.

A cutter bar 20 is securely fixed to the members 14 and is provided with a straight side 20a and a sloping portion 20b. The ends of the blade 20 are removably secured to the respective portions of the mounting members 14 as by suitable bolts 22 and clamping brackets 24. Blade 20 is sharpened to facilitate the cutting action during the trenching operation.

It will be seen that this invention provides a relatively simple, yet very effective, device for producing the desired trench to assist landscape architects and gardeners in producing the desired edge definition for a garden design.

What is claimed is:

1. A sod cutting edger and trencher comprising
   a supporting frame having forward and rear portions including hand gripping means at the rear portions,
   a ground engaging roller journaled at the forward portion of the frame structure, a generally V-shaped sod cutting trencher blade fixed to the frame behind the roller and extending downwardly below the roller into ground engaging trenching position, said V-shaped blade having a generally vertical segment at one side thereof to form a generally straight-sided trench wall and also having a sloping segment extending at an acute angle laterally across the trencher to an opposite side of the frame, means attaching the blade to the frame, a kick-bar fixed to the frame at a location above the blade wherein the frame includes rear handle portion extending upwardly for secure gripping by an operator, and
   a pair of forwardly extending frame elements fixed at the lower end of the handle portions and extending at an obtuse angle therefrom to provide attachment means for the cutter blade and the roller at the lower end of the structure.

2. The structure set forth in claim 1 wherein the blade has a sharpened leading edge to facilitate the cutting operation.

3. The structure set forth in claim 1 and a pair of clamping brackets removably secured to the forward portions of the supporting frame rearwardly of the roller and attaching the trencher blade behind the roller.

* * * * *